United States Patent [19]

Gennesseaux

[11] Patent Number: 5,462,262

[45] Date of Patent: Oct. 31, 1995

[54] HYDRAULIC ANTIVIBRATION DEVICES

[75] Inventor: André Gennesseaux, Chateaudun, France

[73] Assignee: Hutchinson, Paris, France

[21] Appl. No.: 337,117

[22] Filed: Nov. 10, 1994

[30] Foreign Application Priority Data

Dec. 2, 1993 [FR] France ............... 93 14458

[51] Int. Cl.$^6$ .................. F16M 3/00; F16F 7/00
[52] U.S. Cl. .................. 267/140.13; 267/140.14; 267/141.1
[58] Field of Search .............. 267/140.13, 140.11, 267/140.14, 140.2, 141, 141.1, 141.2, 141.3, 141.6, 292, 293, 294, 136; 248/562, 636, 550

[56] References Cited

U.S. PATENT DOCUMENTS

| | | | |
|---|---|---|---|
| 4,650,169 | 3/1987 | Eberhard et al. | 267/140.13 |
| 4,793,600 | 12/1988 | Kojima | 267/140.14 |
| 5,221,078 | 6/1993 | Hartel et al. | 267/140.14 |
| 5,246,212 | 9/1993 | Funahashi et al. | 267/140.13 |
| 5,267,726 | 12/1993 | Takeo et al. | 267/140.14 |

FOREIGN PATENT DOCUMENTS

| | | |
|---|---|---|
| 0547287 | 6/1993 | European Pat. Off. |
| 92 07513 | 12/1993 | France |
| 4036538 | 5/1992 | Germany |

*Primary Examiner*—Robert J. Oberleitner
*Assistant Examiner*—Peter M. Poon
*Attorney, Agent, or Firm*—Larson & Taylor

[57] ABSTRACT

The hydraulic antivibration device is designed to be interposed between the body (9) and the engine (10) of a vehicle. It comprises an annular rigid strength member (1), a rigid rod (2) passing through the strength member, an annular spring (3) resting on the strength member and interposed between the strength member and the rod which passes through the spring, a membrane (4) carried by the strength member and co-operating with an annular wall (6) to define an enclosure disposed above the spring, an intermediate rigid partition (7) carried by the strength member and subdividing the inside of the enclosure into two chambers (A, B), a mass of liquid filling the two chambers and the narrow passage, a first disk (6) secured to the base of the annular wall, and a second disk ($2_1$) secured to the head of the rod, and resting on the spring. A control apparatus is provided causing at will the two disks to move apart from each other axially.

10 Claims, 1 Drawing Sheet

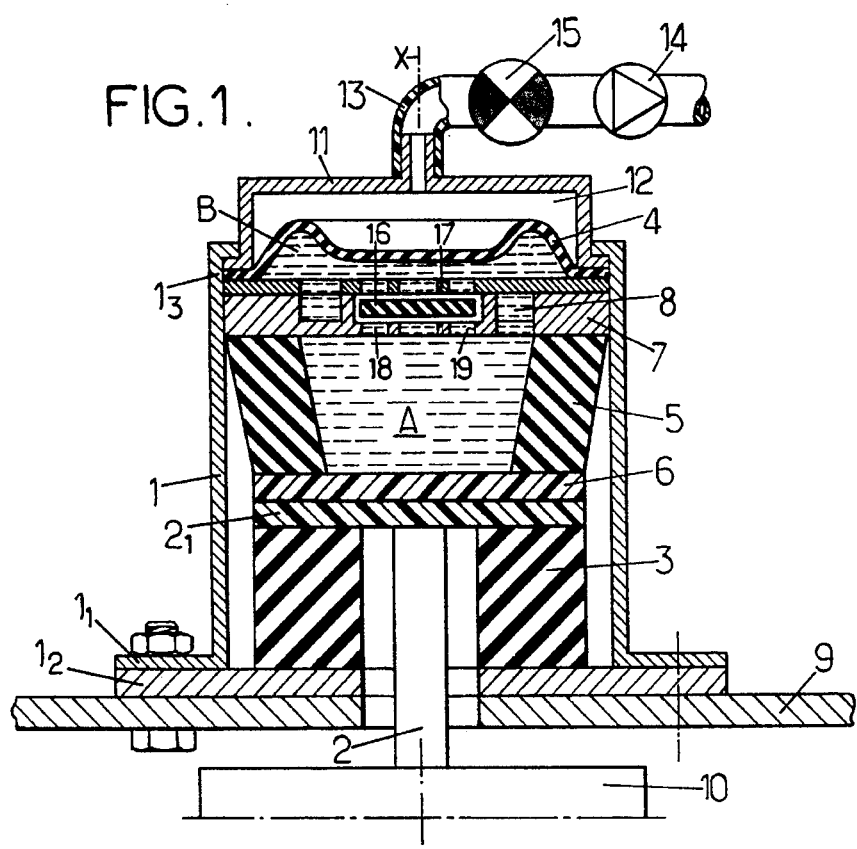
FIG.1.
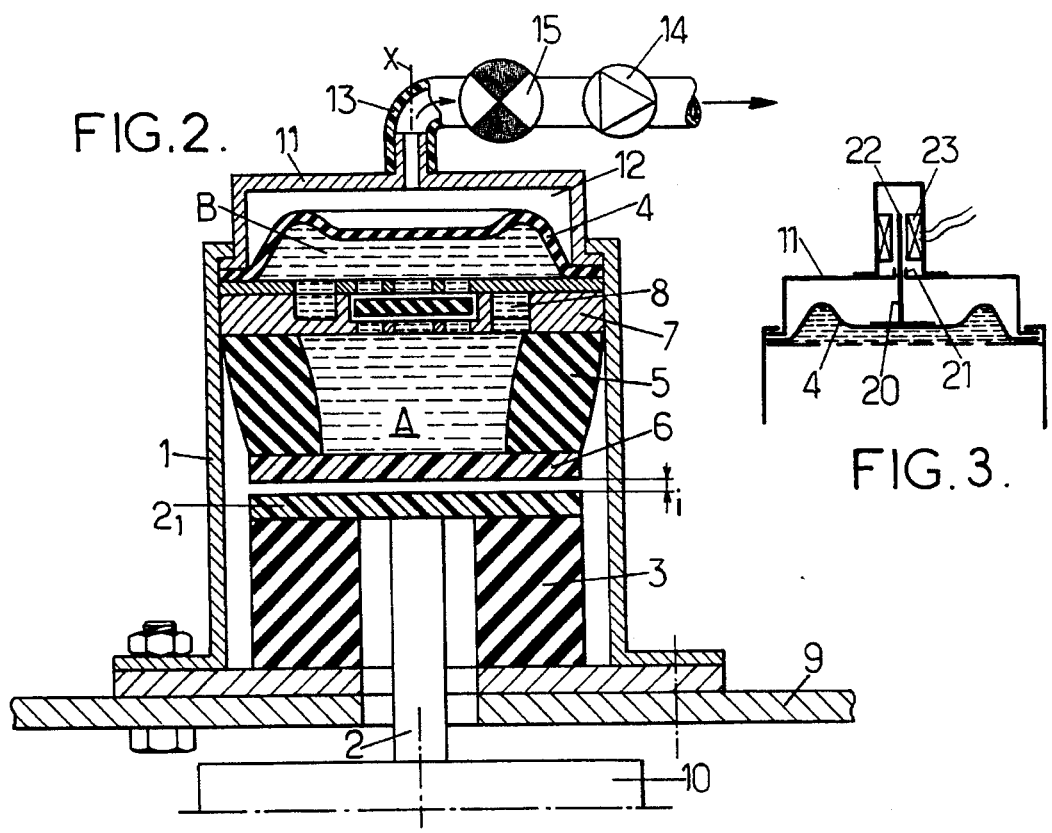
FIG.2.
FIG.3.

HYDRAULIC ANTIVIBRATION DEVICES

The invention relates to hydraulic antivibration devices designed to be interposed for damping and connection or even support purposes between two rigid elements such as a vehicle chassis and the engine of the vehicle.

More particularly, among such devices, the invention relates to those that are of a structure which is generally circularly cylindrical about a vertical axis and that comprise:

an annular rigid strength member and a rigid rod passing through said strength member, the strength member and the rod being suitable for being secured respectively to the two rigid elements that are to be united;

an annular spring of elastomer that withstands axial compression, resting against the strength member and interposed between the strength member and the rod which passes through the spring;

a leakproof flexible upper membrane carried by the strength member and co-operating with at least one leakproof flexible annular wall to define an enclosure disposed above the spring;

an intermediate rigid partition carried by the strength member, extending between the membrane and the annular wall and subdividing the inside of the enclosure into two chambers, a working bottom chamber on the side of the spring, and a compensation chamber;

a narrow passage putting the two chambers permanently into communication with each other;

a mass of liquid filling the two chambers and the narrow passage;

a first disk secured to the base of the annular wall; and a second disk secured to the head of the rod, the second disk being disposed immediately beneath the first disk and resting on the spring.

Such devices are known from French patent No. 92 07513.

In the embodiments of such devices as described in that patent, the entire device is subjected, during assembly, to sufficient axial prestress to ensure that the two disks are permanently pressed against each other in the axial direction while being capable of sliding freely one relative to the other in transverse directions.

Because they are permanently pressed one against the other, these two disks can be considered as being secured to each other in the axial direction, and the device operates continuously as a hydraulic support.

In other words, the effect of applying oscillations of relatively large amplitude (generally greater than 0.5 mm) and of relatively low frequency (generally about 5 Hz to 20 Hz) to the strength member or to the rod, which oscillations are of the kind generated by the "choppiness" due to the vehicle running over rough portions of road, is to urge the liquid from one of the two chambers into the other one and back again through the narrow passage, with the mass of liquid that is being urged in this way being caused to resonate when the frequency of said oscillations reaches a predetermined value that is a function of the ratio between the axial length and the right cross-section of the narrow passage, such resonance providing excellent damping of the oscillations concerned.

The damping is obtained with relatively high stiffness of the device.

When said device is caused to operate at a frequency greater than those mentioned above, namely a frequency of the order of several tens of hertz or even more, as is the case, for example, when the vehicle engine is idling while the vehicle is stationary, then it is desirable to reduce the stiffness of the device and to reduce its damping, since the treatment appropriate to the vibrations generated by the engine is more a question of insulation or absorption than of damping.

For the relatively high frequencies mentioned, it would be quite satisfactory for the elasticity of the device to be provided solely by the spring included in the device, or in other words it would be quite satisfactory for the hydraulic portion of the device to be bypassed.

An object of the invention is, above all, to facilitate such bypassing once the frequency of the oscillations to be treated exceeds a predetermined threshold.

To this end, antivibration devices of the kind in question are essentially characterized, according to the invention, in that they comprise control means for causing at will the two disks to move apart axially and subsequently to come back into contact.

In preferred embodiments, one or more of the following dispositions is preferably used:

—the control means are provided to axially displace the center of the membrane,

—the control means are electrically actuated,

—the control means bring a suction into play,

—in a device according to the preceding paragraph, for which one of the two rigid elements is a vehicle engine, the suction is generated by operation of said engine, —the mutual separation of the two disks is automatically controlled as a function of the overpassing of a given threshold by the frequency or by the amplitude of the vibrations applied to one of the two strength members.

In addition to these main dispositions, the invention comprises certain other dispositions which are preferably used simultaneously therewith and which are explained in greater detail below.

Two preferred embodiments of the invention are described below with reference to the accompanying drawing, and naturally in a manner that is not limiting.

FIGS. 1 and 2 of the drawing show a first hydraulic antivibration device of the invention in axial section, and respectively in each of its two operating states, one at relatively low frequency (5 Hz to 20 Hz) and the other at high frequency.

FIG. 3 shows similarly to FIG. 1, but only partly and in a more schematic manner, a second hydraulic antivibration device of the invention.

The first antivibratory device, shown in FIGS. 1 and 2, is generally circularly symmetrical in shape about a vertical axis X and comprises:

strength member 1 having a vertical axis X and generally in the form of a length tube whose bottom end projects radially outwards to form an annular base $1_1$;

a central rigid rod 2 on the axis X;

an annular spring 3 made of elastomer resting on a perforated plate $1_2$ which is welded beneath the base $1_1$, the spring being interposed vertically between said plate and a rigid disk $2_1$ which is secured to the head of the rod 2;

a top leakproof flexible membrane 4 and a bottom leakproof resilient annular wall 5 that is closed at its base by a rigid disk 6, both mounted in leakproof manner to the strength member 1, inside the top portion thereof and in such a manner that together they form a leakproof annular enclosure;

a rigid intermediate partition 7 carried by the strength member 1, extending between the membrane 4 and the wall 5 and subdividing the inside of the annular enclosure into two annular chambers, a working bottom chamber A and a compensation top chamber B;

a narrow passage 8 formed in the partition 7 and permanently interconnecting the two chambers A and B; and a mass of liquid filling the two chambers A and B and also the narrow passage 8.

The figure also shows that the adjacent edges of the membrane 4, of the bellows 5, and of the intermediate partition 6 are crimped together in a ring 1₃ constituting the top portion of the strength member 1.

The strength member 1 and the rod 2 are respectively secured to the two parts between which it is desired to reduce or prevent the transfer of vibrations or oscillations; in preferred embodiments, the strength member 1 is mounted to the bodywork 9 of a vehicle and the rod 2 to the engine 10 of said vehicle which is then suspended therebelow.

During assembly, the device is subjected to sufficient axial prestress to ensure that the two disks 2₁ and 6 are pressed permanently one against the other along the direction of the axis X, while being free to slide relative to each other in transverse directions.

These disks, or at least their surfaces that are in mutual contact, are made of a material having good resistance to wear and a coefficient of friction which is either low in order to facilitate relative transverse sliding, or else on the contrary high in order to impede such sliding.

When sliding is to be facilitated, said material is advantageously a polyamide filled with glass fibers, and preferably also with molybdenum bisulfate. When sliding is to be impeded, the material in question may be based on rubber.

In addition, the top membrane 4 is covered by a lid or cap 11 having a downwardly extending edge suitable for forming a gastight housing 12 in association with the membrane: to this end, the bottom ends of the edges extend outwardly and are crimped together with the edges of the above-mentioned adjacent parts inside the ring 1₃.

A pipe 13 connects the inside of the housing 12 to one of the sources of suction 14 available from the engine 10 when it is in operation, the connection passing through a valve 15.

The valve 15 is an on/off valve and may:

be a manually controlled valve having a control member that is easily accessible to the driver of the vehicle; or be automatic, e.g. being servo-controlled to the frequency of the oscillations generated on one of the elements 9 and 10 exceeding a given threshold.

The above-described device operates as follows.

So long as the valve 15 is closed and consequently no suction is applied by the pipe 13 to the housing 12, then the two disks 2₁ and 6 remain firmly pressed axially one against the other because of the assembly prestress, and the device operates in the same manner as an ordinary hydraulic device: axial oscillations of the engine 10 relative to the bodywork 9, i.e. of the rod 2 relative to the strength member 1, and still more precisely of the disk 2₁ relative to the rigid partition 7, give rise to back-and-forth motion of the liquid between the chambers A and B via the narrow passage 8, and when said oscillations are at a given frequency, the liquid column present in the passage 8 enters resonance, thereby providing excellent damping of the oscillations concerned.

When the valve 15 is opened, the effect of suction from the source 14 being applied inside the housing 12 is to raise the membrane 4, thereby raising together with the membrane the mass of liquid located in the two chambers A and B, thus contracting the wall 5 axially and lifting the disk 6.

As soon as the disk 6 is lifted through a distance greater than the distance through which it was lowered because of the initial assembly prestress, it is observed that the two disks 2₁ and 6 separate, i.e. clearance i is opened up between the two disks (FIG. 2).

Once this happens, the hydraulic portion of the device is carried solely by the strength member 1, and is therefore bypassed: the elasticity of the support is then due solely to the presence of the spring 3.

The support then exhibits low stiffness and no damping, thus making it entirely suitable for insulating vibrations of relatively high frequency.

To change over from the first type of operation to the second, it is appropriate to control the valve 15 in such a manner that the suction is not applied to the housing 12 so long as the frequency of the oscillations to be treated remains relatively low, i.e. below a predetermined threshold S, which threshold may be of the order of 20 Hz to 25 Hz, for example, and for suction to be applied as soon as said frequency exceeds the threshold.

Such a changeover can be made automatic and servo-controlled to the threshold S being exceeded by the frequency of the oscillations or vibrations to be treated, which frequency is then detected and measured continuously by an appropriate sensor.

In an embodiment that has given full satisfaction and that is described purely by way of illustration:

the suction applied inside the housing 12 during "high frequency" operation was about 800 millibars; and the overall height through which the disk 2₁ was raised as a result of suction being applied was about 1.5 mm, corresponding to a residual clearance i of about 0.5 mm, with the lowering of the two disks 2₁ and 6 pressed together by the assembly prestress itself being of the order of 1 millimeter.

In the drawing, there can also be seen a membrane or "valve member" 16 mounted in such a manner as to be capable of vibrating with limited amplitude (generally less than 1 mm) between two grids 17 and 18 extending across an orifice 19 formed through the partition 7 and suitable for causing the two chambers A and B to be put into communication with each other.

As is known, vibrations of the valve member 16 which is used for "high frequency decoupling" serves to absorb vibrations of relatively small amplitude and relatively high frequency as transmitted between the parts 1 and 2.

This improvement increases the performance that it is possible to obtain from the above-described antivibration device.

It makes it possible to select between two techniques for insulating vibrations at relatively high frequency, namely: making use of suction which serves to bypass the hydraulic portion of the device completely; or using the decoupling valve member which means that the hydraulic portion is still in use and that depression is not being used.

In practice, the criterion adopted for selecting between these two techniques is advantageously the amplitude of the vibrations under consideration:

when the amplitude is relatively low, which corresponds to normal operation of the vehicle engine, use of the valve member 16 is entirely satisfactory, so there is no point in reducing the stiffness of the support; but when said amplitude exceeds a given threshold, which corresponds in particular to the engine idling while the vehicle is stationary, the valve member runs the risk of coming into abutment against its grids, and it is then appropriate to use the first technique of bypassing the hydraulic portion.

The corresponding selection can easily be obtained by servo-controlling actuation of the valve 15 to parameters representative of the engine idling while the vehicle is stationary, and in particular to the accelerator pedal of the vehicle being in its high position.

It should be observed that adopting this criterion is particularly welcome in the present case of the suction being taken from a point immediately downstream from the throttle butterfly valve: the suction is at its greatest when the engine is idling in this way.

The second antivibratory device shown in FIG. 3 only differs from the first by the fact that the control of the displacements of the membrane 4, instead of using a suction, is electrically executed.

To this end, the elements 13 to 15 of FIGS. 1 and 2 are here suppressed and the center of the membrane 4 is fixed, through a rod 20 which passes through the center of the lid 11, in an appropriate guide 21, to the core 22 of an electromagnet 23 mounted on said lid 11.

So, the assembly made by the rod 20 and the membrane 4 is urged upwards when the electromagnet 23 is electrically excited, what separates the disk 6 from the disk $2_1$.

On the contrary, when the electromagnet 23 is not electrically excited, said assembly falls down again, due to the mere gravity and/or to the action of a light apppropriate return spring: the two disks 6 and $2_1$ are then again jointingly applied one on each other.

The assembly is provided so as the vertical displacements of the rod 20 are, when the electromagnet is not excited, sufficiently free for not disturbing the "compensation" deformations of the membrane 4.

Of course, the excitations of the electromagnet 23 lend themselves to the same automatic controls as the control of the above valve 15.

As a result, whichever embodiment is used, a device is obtained whose structure, operation, and advantages can be seen sufficiently well from the above description.

Naturally, and as follows from the above, the invention is not limited to any way to the particular applications and embodiments that have been mentioned more particularly.

On the contrary, the invention extends to any variant, in particular:

variants in which the hydraulic portion comprising elements 4 to 8 as described above occupy an annular configuration about the axis X, as described in the above-mentioned French patent, in which case the disk 6 is reduced to the form of an annular washer, variants in which the circular symmetry of the device would be only incomplete, the horizontal section of the device having for instance the elongate form of two half circles having the same diameter opened one towards the other and mutually connected by two parallel rectilinear sections, and variants in which the spacings of the two disks $2_1$ and 6 would be controlled by means other than those above described, for instance by a mechanism with a rotating cam and a lever which could be electrically actuatable and connected with a rod similar to the above rod 20, said connection being provided with a clearance such that, when the mechanism is not actuated, the displacements of the membrane 4 are sufficiently free.

I claim:

1. A hydraulic antivibration device designed to be interposed between two rigid elements, the structure of the device being circularly symmetrical about a vertical axis and the device comprising: an annular rigid strength member and a rigid rod passing through said strength member, the strength member and the rod being suitable for being secured respectively to the two rigid elements that are to be united; an annular spring of elastomer that withstands axial compression, resting against the strength member and the rod which passes through the spring; a leakproof flexible upper membrane carried by the strength member and co-operating with at least one leakproof flexible annular wall to define an enclosure disposed above the spring; an intermediate rigid partition carried by the strength member, extending between the membrane and the annular wall and subdividing the inside of the enclosure into two chambers, a working bottom chamber on the side of the spring, and a compensation chamber; a narrow passage putting the two chambers permanently into communication with each other; a mass of liquid filling the two chambers and the narrow passage; a first disk secured to the base of the annular wall; and a second disk secured to the head of the rod, the second disk being disposed immediately beneath the first disk and resting on the spring; the device being characterized in that it comprises control means for causing at will the two disks to move apart axially and subsequently to come back into contact.

2. An antivibratory device according to claim 1, characterized in that the control means are provided to axially displace the center of the membrane.

3. An antivibratory device according to claim 1, characterized in that the control means are electrically actuated.

4. An antivibratory device according to claim 1, characterized in that the control means bring a suction into play.

5. An antivibration device according to claim 4, in which one of the two rigid elements is a vehicle engine, characterized in that the suction is generated by operation of said engine, and in that application of the suction is servo-controlled to the engine idling while the vehicle is stationary.

6. An antivibration device according to claim 4, characterized in that the means for controlling relative axial displacement of the two disks comprise: a lid covering the membrane so as to co-operate therewith to form a gastight housing, a pipe connecting the inside of said housing to a source of suction, and a control valve mounted on said pipe so as to control the connection between the housing and the source.

7. An antivibration device according to claim 1, characterized in that it comprises means for detecting the frequency of the vibrations applied to one of the strength member and means for servo-controlling the mutual separation of the two disks to the overpassing of a given threshold by said frequency.

8. An antivibration device according to claim 1, characterized in that the intermediate partition is pierced by an orifice enabling the two chambers to be put into communication with each other, and fitted with a valve member whose displacements or deformations are of a limited amplitude that is at most equal to 1 mm.

9. An antivibration device according to claim 8, characterized in that it comprises means for detecting the amplitude of the vibrations applied to one of the strength member and means for servo-controlling the mutual separation of the two disks to the overpassing of a given threshold by said amplitude.

10. An antivibration device according to claim 1, characterized in that its hydraulic portion comprising the assembly constituted by the membrane, the wall, the disk connected to said wall, and the intermediate partition has an annular configuration about the axis, the disk connected to the wall then being in the form of a washer.

* * * * *